(12) United States Patent
Morise

(10) Patent No.: US 7,624,660 B2
(45) Date of Patent: Dec. 1, 2009

(54) AUTOMATIC TRANSMISSION

(75) Inventor: Masaru Morise, Nukata-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 430 days.

(21) Appl. No.: 11/518,253

(22) Filed: Sep. 11, 2006

(65) Prior Publication Data

US 2007/0078036 A1 Apr. 5, 2007

(30) Foreign Application Priority Data

Oct. 3, 2005 (JP) .............................. 2005-290223

(51) Int. Cl.
*F16H 57/04* (2006.01)
*H01R 12/16* (2006.01)

(52) U.S. Cl. ..................... 74/467; 74/606 A; 361/689; 184/6.12

(58) Field of Classification Search ............... 74/467, 74/606 A; 475/159; 184/6.12, 7.4, 65, 68; 361/689, 698, 699
See application file for complete search history.

(56) References Cited

U.S. PATENT DOCUMENTS

| 4,658,665 | A | * | 4/1987 | Strinzel et al. ................. 74/467 |
| 4,805,490 | A | * | 2/1989 | Fuehrer et al. ............ 74/606 R |
| 5,662,007 | A | * | 9/1997 | Starker et al. ............. 74/606 A |
| 6,679,137 | B1 | * | 1/2004 | Bek .......................... 74/606 R |
| 7,073,410 | B2 | * | 7/2006 | Albert ...................... 74/606 R |
| 7,265,978 | B2 | * | 9/2007 | Suzuki et al. ............... 361/699 |
| 7,373,824 | B2 | * | 5/2008 | Krieger et al. ................ 73/700 |
| 2002/0088304 | A1 | * | 7/2002 | Thorum et al. ............ 74/606 R |
| 2006/0054410 | A1 | * | 3/2006 | Nakamura et al. ......... 184/6.12 |

FOREIGN PATENT DOCUMENTS

| DE | 29 39 723 C2 | 6/1980 |
| DE | 39 21 932 A1 | 1/1991 |
| DE | 195 29 586 C1 | 8/1996 |
| DE | 197 10 931 A1 | 10/1997 |
| DE | 197 15 592 A1 | 10/1998 |
| DE | 198 55 319 A1 | 6/2000 |
| DE | 198 55 321 A1 | 6/2000 |
| DE | 10 2005 013 861 A1 | 10/2005 |
| JP | 61-131582 | 8/1986 |
| JP | 8-510317 | 10/1996 |
| JP | 11-63178 | 3/1999 |
| JP | 2003-520336 | 7/2003 |
| JP | 2004-125028 | 4/2004 |
| JP | 3545195 | 4/2004 |

* cited by examiner

*Primary Examiner*—Roger Pang
(74) *Attorney, Agent, or Firm*—Oblon, Spivak, McClelland, Maier & Neustadt, L.L.P.

(57) ABSTRACT

An automatic transmission according to the invention includes: a hydraulic pressure supply unit which is disposed, together with a gear train, inside a case and switches a shift state (gear ratio) of the gear train based on a supply of hydraulic pressure from hydraulic fluid; a control unit which is disposed in the case and detachably connected to the hydraulic pressure supply unit, and electrically controls the hydraulic pressure supply unit; and a storage portion which is provided in the case and temporarily stores hydraulic fluid supplied to the gear train, and cools the control unit by the stored hydraulic fluid.

13 Claims, 5 Drawing Sheets

AUTOMATIC TRANSMISSION

INCORPORATION BY REFERENCE

The disclosure of Japanese Patent Application No. 2005-290223 filed on Oct. 3, 2005, including the specification, drawings and abstract is incorporated herein by reference in its entirety.

BACKGROUND OF THE INVENTION

1. Field of the Invention

The invention relates to an automatic transmission to be mounted in a vehicle or the like.

2. Description of the Related Art

In addition to a plurality of gears which form a gear train for transmitting power, an automatic transmission is also provided with a hydraulic pressure supply unit that switches gear ratios using hydraulic pressure, and a control unit which controls a solenoid valve of the hydraulic pressure supply unit based on the running state of the vehicle, for example. Here, the hydraulic pressure supply unit is arranged inside a case of the automatic transmission, while the control unit is usually arranged outside of the case because it houses many electronic components.

Distancing the hydraulic pressure supply unit and the control unit from one another by having one located inside the case and the other located outside the case in this way increases the length of the signal wire that electrically connects the two. As the length of the signal wire increases, the reliability of the control signal decreases due to the weight of the noise and the like, for example.

It is therefore conceivable that this problem could be avoided by arranging the control unit inside the case of the automatic transmission together with the hydraulic pressure supply unit so that the signal wire which connects the hydraulic pressure supply unit to the control unit can be shorter.

The problem with this structure, however, is that when the control unit itself generates heat, the temperature of the elements in the control unit may exceed the allowable temperature due to radiant heat from the gear train and the like and heat buildup within the case. As a result, reliability of the control unit may decrease.

SUMMARY OF THE INVENTION

An automatic transmission according to one aspect of the invention is provided with a hydraulic pressure supply unit which is disposed, together with a gear train, inside a case and switches a shift state (gear ratio) of the gear train based on a supply of hydraulic pressure from hydraulic fluid; a control unit which is disposed in the case and detachably connected to the hydraulic pressure supply unit, and electrically controls the hydraulic pressure supply unit; and a storage portion which is provided in the case and temporarily stores hydraulic fluid supplied to the gear train, and cools the control unit by the stored hydraulic fluid.

According to this structure, the control unit is disposed inside the case of the automatic transmission and detachably connected to the hydraulic pressure supply unit, which obviates the need for a signal wire to connect the hydraulic pressure supply unit with the control unit. As a result, the problem which would otherwise occur when a long signal wire is used can be avoided. Also, hydraulic fluid supplied to the gear train is temporarily stored in the storage portion provided in the case and the control unit is cooled by this hydraulic fluid. As a result, an increase in the temperature of the control unit is able to be inhibited while a good electrical connection is able to be maintained between the hydraulic pressure supply unit and the control unit.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF THE PREFERRED EMBODIMENTS

In the following description, the present invention will be described in more detail in terms of exemplary embodiments.

Hereinafter, an automatic transmission according to a first example embodiment of the invention will be described with reference to FIGS. 1 to 3.

Figure 1:
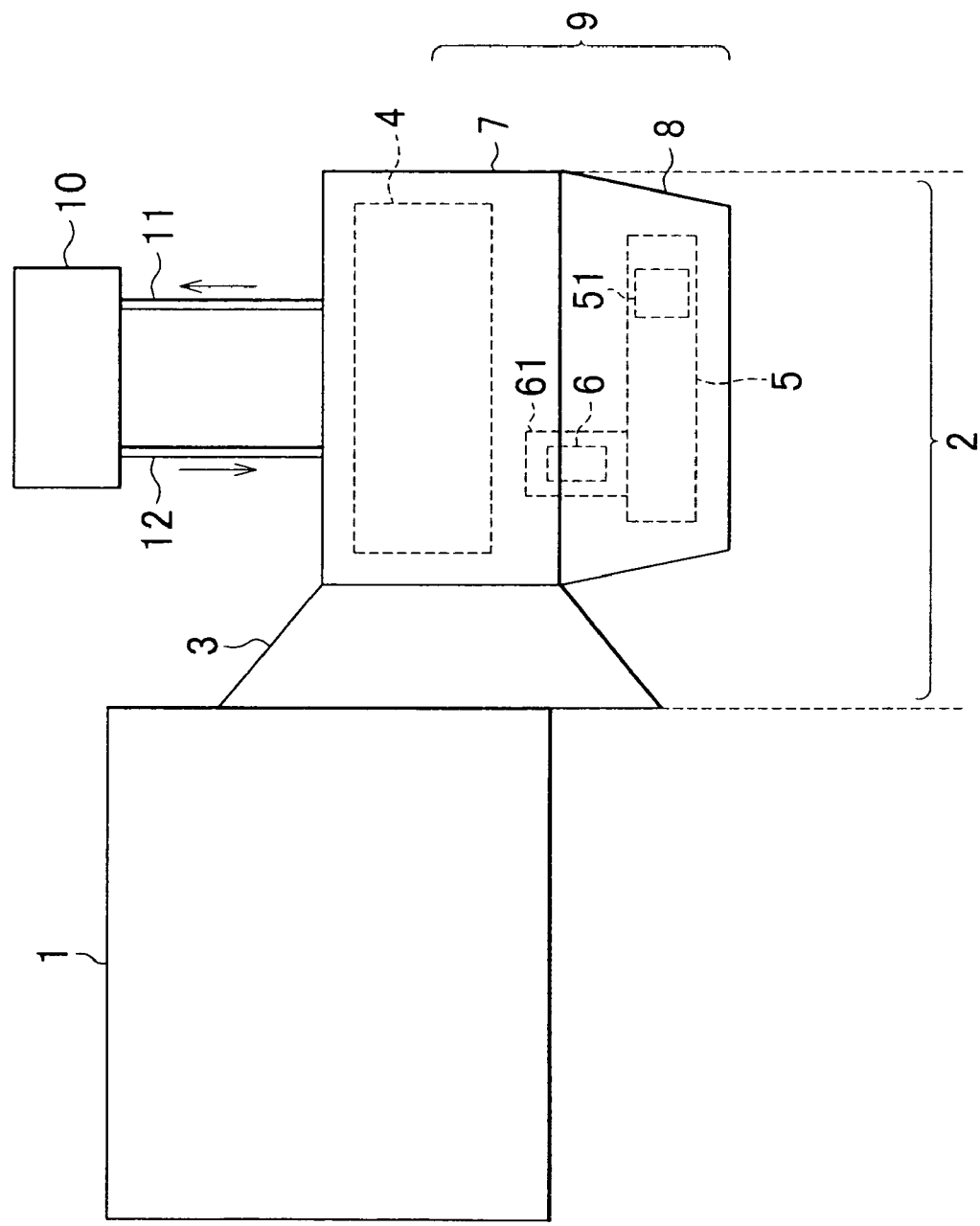
FIG. 1 is a block diagram schematically illustrating the structure of an automatic transmission according to a first example embodiment and peripheral devices thereof.

FIG. 1 is a block diagram schematically illustrating the structure of an automatic transmission for a vehicle, as well as peripheral devices thereof.

As shown in the drawing, an engine 1 and an automatic transmission 2 are mounted in a vehicle. The automatic transmission 2 includes a torque converter 3 which is connected to an output shaft of the engine 1; a gear train 4 which is connected to an output shaft of the torque converter 3; a hydraulic pressure supply unit 5 which switches a shift state (gear ratio) of the gear train 4 based on a supply of hydraulic pressure from hydraulic fluid; and a control unit 6 which controls the supply of hydraulic pressure from the hydraulic pressure supply unit 5 based on the running state of the vehicle and the operating state of the engine. The hydraulic pressure supply unit 5 includes a plurality of solenoid valves 51 such as regulator valves. The control unit 6 controls the supply of hydraulic pressure from the hydraulic pressure supply unit 5 to the torque converter 3 and the gear train 4 by switching these solenoid valves 51 open and closed. The torque converter 3, the gear train 4, the hydraulic pressure supply unit 5, and the control unit 6 are all housed inside a case 9 formed of a gear case 7 and an oil pan 8. Also, the control unit includes a plurality of electronic components which are housed in a resin case 61 to protect them from becoming fouled by hydraulic fluid.

Meanwhile, an oil cooler 10 for cooling the hydraulic fluid is provided outside the case 9. Two passages connect this oil cooler 10 with the hydraulic pressure supply system inside the automatic transmission 2. One of these passages is an introduction passage 11 for introducing hydraulic fluid of a raised temperature into the oil cooler 10, and the other of the passages is a return passage 12 for returning hydraulic fluid that has been cooled by the oil cooler 10 back into the automatic transmission 2.

Next, the arrangement of the hydraulic pressure supply unit 5 and the control unit 6 inside the case 9 will be described with reference to FIG. 2 which shows the cross section structure of the automatic transmission 2.

Figure 2:
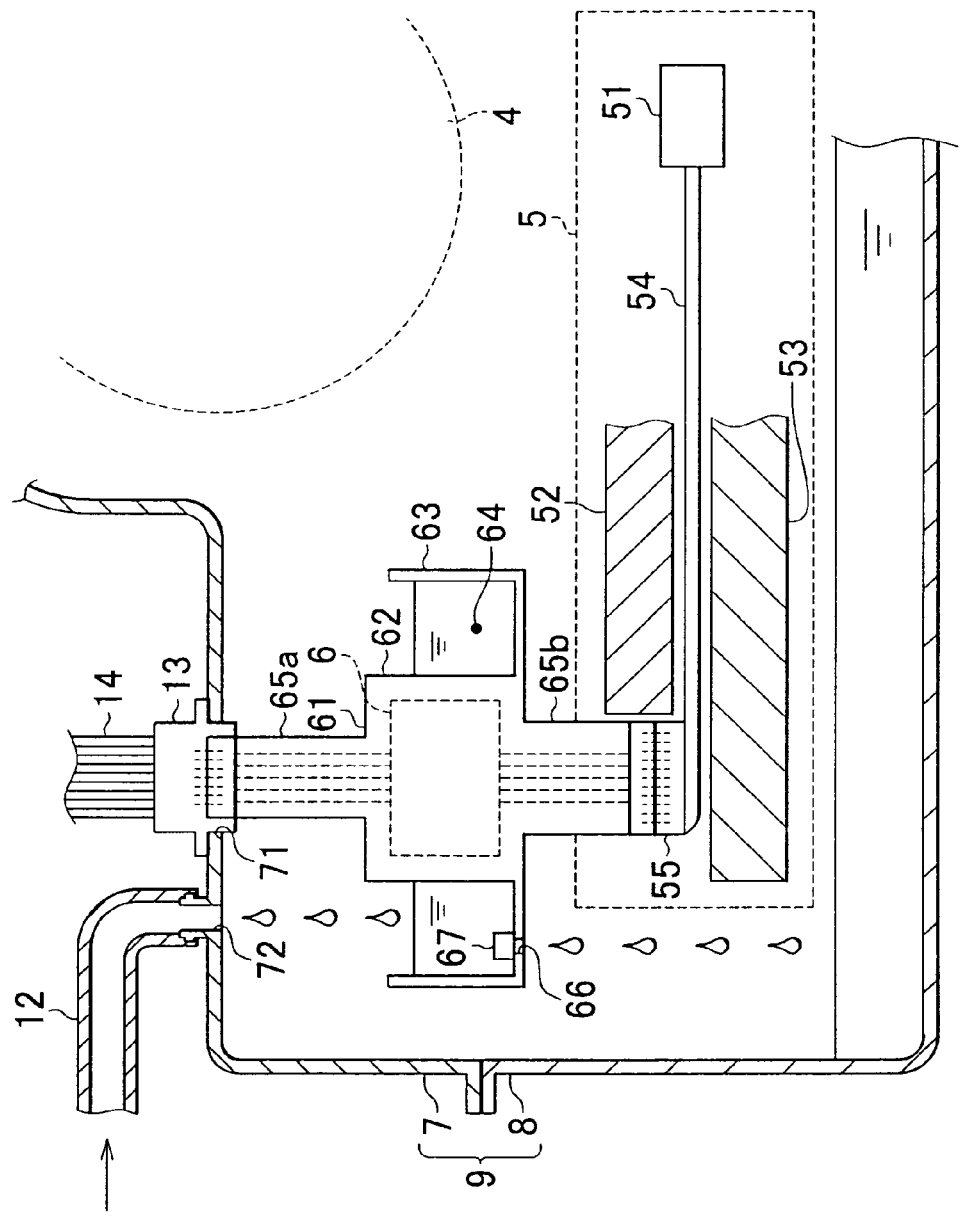
FIG. 2 is a sectional view of the automatic transmission according to the first example embodiment.

As shown in FIG. 2, the hydraulic pressure supply unit 5 includes an upper body 52 positioned on the gear train 4 side and a lower body 53 positioned on the oil pan 8 side. The control unit 6 is arranged above the hydraulic pressure supply unit 5. The case 61 housing the control unit 6 includes an encasing portion 62 that encases the entire periphery of the control unit 6, a storage portion 63 provided on the outer peripheral surface of this encasing portion 62, and connecting portions 65a and 65b which extend up and down from the encasing portion 62. As shown in FIG. 2, the storage portion 63 is formed so as to surround the entire outer periphery of the encasing portion 62. An annular concave portion 64 is formed between the outer peripheral wall of the encasing portion 62 and the inner wall of the storage portion 63. Hydraulic fluid that was cooled by the oil cooler 10 passes through the return passage 12 and into the storage portion 63, i.e., into the concave portion 64. Then when the automatic transmission 2 is operating, the control unit 6 is cooled by the hydraulic fluid that is supplied into this storage portion 63. Therefore, the storage portion 63 is formed in a position corresponding to the control unit 6 in the vertical direction of the encasing portion 62. The height of the storage portion 63 is preferably equal to or greater than that of the control unit 6. It is also desirable that the positional relationship of the two be set such that the entire control unit 6 fit within the area over which the storage portion 63 is formed.

A through-hole 71 is formed in the gear case 7 and a connector 13 is inserted into this through-hole 71 from outside the gear case 7. One of the connecting portions 65a fits into this connector 13, which enables the control unit 6 and the signal wires 14 of various sensors provided in the engine 1 and the automatic transmission 2 and the like to be electrically connected.

The other connecting portion 65b detachably fits with a connector 55 of a signal wire 54 that extends between the upper body 52 and the lower body 53, thus enabling the control unit 6 and the solenoid valves 51 and the like of the hydraulic pressure supply unit 5 to be electrically connected.

A return port 72 is formed in a location in the upper portion of the gear case 7 that corresponds to the concave portion 64 of the storage portion 63. The return passage 12 is connected to this return port 72. Accordingly, the hydraulic fluid that was cooled by the oil cooler 10 passes through this return port 72 and returns to the automatic transmission 2. At this time, the cooled hydraulic fluid flows directly into the storage portion 63 through the return port 72.

A discharge hole 66 for discharging hydraulic fluid in the storage portion 63 into the oil pan 8 is formed in a bottom portion of the storage portion 63. A metering valve 67 which meters the hydraulic fluid discharged through the discharge hole 66 in accordance with an opening amount of the metering valve 67 is provided in this discharge hole 66. This metering valve 67 is a temperature sensitive valve in which the opening amount thereof automatically changes depending on the temperature of the hydraulic fluid such that less hydraulic fluid is discharged the higher the temperature of the hydraulic fluid in the storage portion 63.

Figure 3A:
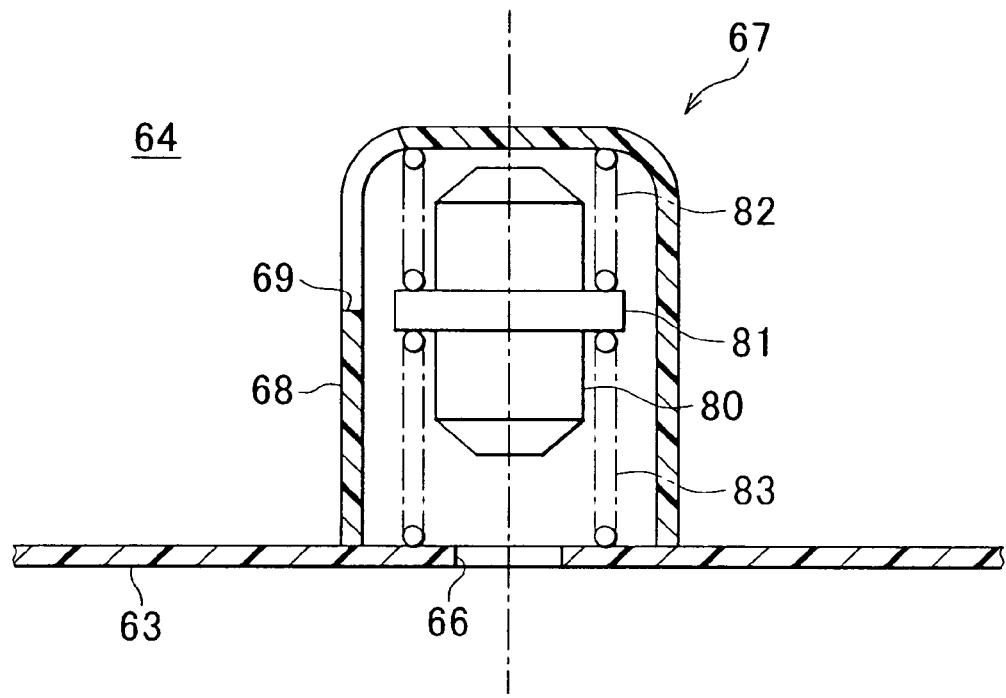
FIGS. 3A and 3B are sectional views of a metering valve according to the first example embodiment.
Figure 3B:
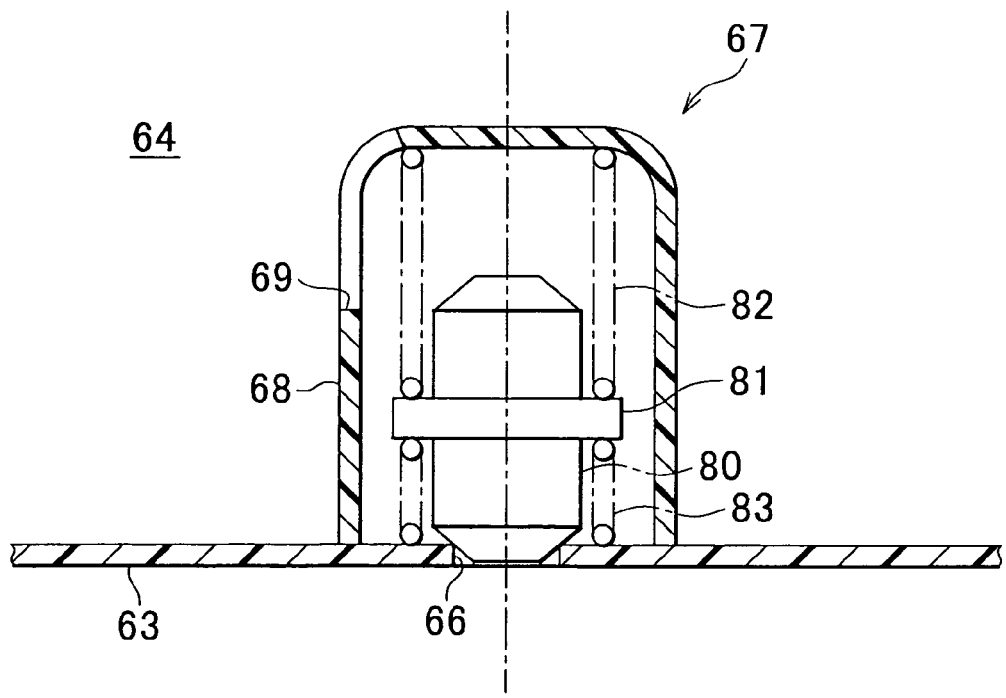

Next, this metering valve 67 will be described with reference to FIGS. 3A and 3B. FIGS. 3A and 3B show the sectional structure of the metering valve 67. FIG. 3A shows the metering valve 67 when the temperature of the hydraulic fluid is low, and FIG. 3B shows the metering valve 67 when the temperature of the hydraulic fluid is high.

As shown in FIG. 3A, a valve case 68 is formed on the bottom portion of the storage portion 63 to cover the discharge hole 66. An introduction hole which communicates between inside and outside the valve case 68 is formed in a slanted upper portion of the valve case 68. The hydraulic fluid in the storage portion 63 is introduced into the valve case 68 through this introduction hole 69. Further, a valve body 80 for adjusting the open/closed state of the discharge valve 66 is arranged inside the valve case 68. This valve body 80 is generally column shaped with a flange 81 formed on an upper end portion thereof. The lower end portion of the valve body 80 is tapered downward.

Also, a spring 82 is arranged between the flange 81 and the upper portion of the inner wall of the valve case 68. Similarly, a spring 83 is arranged between the flange 81 and the lower portion of the inner wall of the valve case 68. Accordingly, the valve body 80 is urged downward by the spring 82 and urged upward by the spring 83. The spring body 80 is maintained in a position in which the upward and downward spring forces from these springs 82 and 83 balance out. Here, of the two springs 82 and 83 described above, the spring 82 provided between the flange 81 and the upper portion of the inner wall of the valve case 68 is formed of a shape memory alloy which expands at high temperatures and contracts at low temperatures.

Next, the operation of the metering valve 67 will be described. When the temperature of the hydraulic fluid in the storage portion 63 is low, it affects (i.e., reduces) the temperature of the spring 82. At this time, the spring 82 contracts in response to the temperature such that the force from the spring 82 that urges the valve body 80 is less than it is when the temperature is high. As a result, the valve body 80 is positioned substantially in the middle between the upper portion of the inner peripheral surface of the valve case 68 and the top surface of the storage portion 63, as shown in FIG. 3A. Accordingly, the discharge hole 66 is not closed off by the valve body 80 so hydraulic fluid can be returned to the oil pan 8 through the discharge hole 66.

On the other hand, when the temperature of the hydraulic fluid in the storage portion 63 is high, it affects (i.e., increases) the temperature of the spring 82. At this time, the spring 82 expands in response to the temperature such that the force from the spring 82 that urges the valve body 80 is greater than it is when the temperature is low. As a result, the valve body 80 drops to a lower position than when the temperature is low, thereby reducing the amount of hydraulic fluid discharged through the discharge hole 66. As the temperature increases further, the valve body 80 drops down even further, completely closing off the discharge hole 66, as shown in FIG. 3B.

The example embodiment described above enables the following effects to be obtained.

(1) The control unit 6 is disposed inside the case 9 of the automatic transmission 2 and detachably connected to the hydraulic pressure supply unit 5 which obviates the need for a signal wire to connect the hydraulic pressure supply unit 5 with the control unit 6. As a result, the problem which would otherwise occur when a long signal wire is used can be avoided. Also, hydraulic fluid that is supplied to the gear train 4 is temporarily stored in the storage portion 63 provided in the case 9 so the control unit 6 is cooled by that hydraulic fluid. As a result, an increase in the temperature of the control unit 6 is able to be inhibited while a good electrical connection is able to be maintained between the hydraulic pressure supply unit 5 and the control unit 6.

(2) The storage portion 63 is formed on the outer peripheral surface of the encasing portion 62 that encases the control unit 6 so that the hydraulic fluid in the storage portion 63 can be present at the position as close as possible to the control unit 6 that is housed in the case 61. As a result, the control unit 6 is able to be well cooled by that hydraulic fluid.

(3) The hydraulic fluid that was cooled by the oil cooler 10 so that its temperature is reduced is stored in the storage portion 63 before flowing to the hydraulic pressure supply unit 5. Accordingly, supplying hydraulic fluid before its temperature is raised by heat generated by the automatic transmission 2 as it operates enables the cooling function of the storage portion 63 to be maintained at a high level.

(4) When the hydraulic fluid is heated such that its temperature rises due to friction heat or the like generated as the automatic transmission 2 operates, the surface of the hydraulic fluid in the oil pan 8 rises due to thermal expansion of the hydraulic fluid. Therefore, if the temperature of the hydraulic fluid becomes too high, it is possible that the surface height of the hydraulic fluid in the oil pan 8 will be unable to be maintained within the appropriate range.

Regarding this, according to this example embodiment, the opening amount of the metering valve 67 is adjusted to reduce the amount of hydraulic fluid discharged to the oil pan 8 the higher the temperature of that hydraulic fluid. Therefore, the net amount of hydraulic fluid within the oil pan 8 decreases the higher the temperature of the hydraulic fluid. As a result, even if there is a large degree of thermal expansion of the hydraulic fluid, the surface height of the hydraulic fluid in the oil pan 8 can still be maintained within the appropriate range.

Hereinafter, an automatic transmission according to a second example embodiment of the invention will be described with reference to FIG. 4. This example embodiment differs from the first example embodiment with respect to two points. First, a through-hole for inserting the control unit from the outside of the case, and a guide portion for guiding the control unit when it is inserted into the case, are formed in the gear case. Second, the storage portion for temporarily storing hydraulic fluid is formed on the guide portion.

Hereinafter, the second example embodiment will be described mainly focusing on the two points described above which differ from the first example embodiment. The structures of the gear train 4 and the hydraulic pressure supply unit 5 are the same as those in the foregoing first example embodiment.

Figure 4:
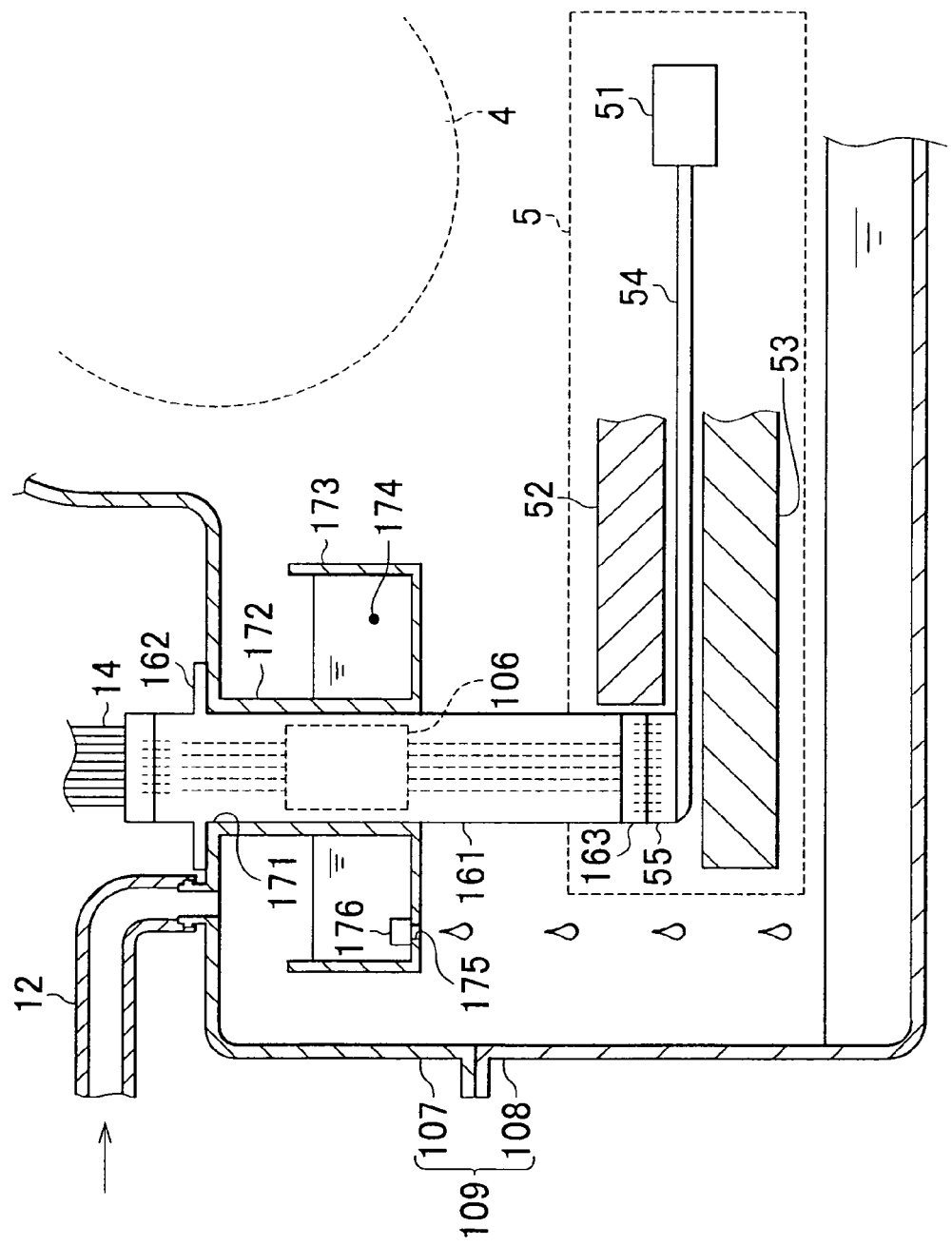
FIG. 4 is a sectional view of an automatic transmission according to a second example embodiment.

As shown in FIG. 4, a through-hole 171 is formed in a gear case 107, and a case 161 which houses a control unit 106 is inserted into this through-hole 171 from outside the gear case 107. A flange 162 is formed on this case 161 and fixed to the outer peripheral surface of the gear case 107. The control unit 106 includes a plurality of electronic components. Signal wires 14 from various sensors provided in the engine 1 and the automatic transmission 2 and the like are connected to one end of this case 161 such that the signal wires 14 and the control unit 106 are electrically connected.

Also, a connecting portion 163 is provided at the other end portion of the case 161. The connecting portion 163 is detachably fitted to a connector 55 of a signal wire 54 running between an upper body 52 and a lower body 53 such that the control unit 106 and the solenoid valves 51 and the like of the hydraulic pressure supply unit 5 are electrically connected. The case 161 is a formed from a single piece resin.

A guide portion 172 which guides the control unit 106 when it is inserted into the case 109 is formed at a portion of the gear case 107 where the through-hole 171 is formed, as shown in FIG. 4. As shown in the drawing, a storage portion 173 is formed at the outer periphery of this guide portion 172 so as to surround the entire periphery of the guide portion 172. An annular concave portion 174 is formed between the outer peripheral wall of the guide portion 172 and the inner peripheral wall of the storage portion 173. Hydraulic fluid that was cooled by the oil cooler 10 passes through the return passage 12 and into the storage portion 173, i.e., into the concave portion 174. Then when the automatic transmission 2 is operating, the control unit 106 is cooled by the hydraulic fluid that is supplied into this storage portion 173. Therefore, the storage portion 173 is formed in a position corresponding to the control unit 106 in the vertical direction of the case 161. The height of the storage portion 173 is preferably equal to or greater than that of the control unit 106. It is also desirable that the positional relationship of the two be set such that the entire control unit 106 fit within the area over which the storage portion 173 is formed.

Also, just as in the first example embodiment, a discharge hole 175 for discharging the hydraulic fluid from the storage portion 173 into an oil pan 108 is formed in a bottom portion of the storage portion 173 and a metering valve 176 is provided in this discharge hole 175.

The example embodiment described above enables the following effects to be obtained.

The guide portion 172 helps to align the control unit 106 when the control unit 106 is being connected to the hydraulic pressure supply unit 5, thereby making it easier to connect the two. This guide portion 172 can also serve as the storage portion 173 that supplies hydraulic fluid, which makes it possible to suppress an increase in size of the automatic transmission 2 that would otherwise occur when the storage portion 173 is provided.

The foregoing example embodiments may also be implemented with the following modifications.

Figure 5:
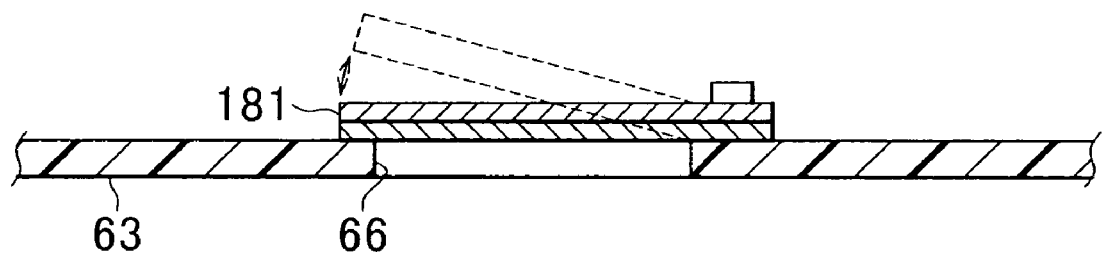
FIG. 5 is a sectional view showing a modified example of the metering valve.

In the foregoing example embodiment, the metering valve 67 is formed using the spring 82 made of a shape memory alloy. The structure of the metering valve is not limited to this, however. Alternatively, for example, the metering valve may be formed of a bimetal which is formed by bonding two sheets of different metals, each having a different coefficient of thermal expansion. More specifically, a structure can be employed in which a plate-shaped metering valve 181 is provided to open and close the discharge hole 180, as shown in FIG. 5. In this case, the metering valve 181 is formed such that when its temperature is low, it deforms and moves to the position indicated by the broken line, and when its temperature is high, it deforms the other way and moves to the position indicated by the solid line. This kind of structure enables the opening amount of the metering valve 181 to be adjusted so that less hydraulic fluid is discharged from the storage portion the higher the temperature of that hydraulic fluid.

In the foregoing example embodiments, the discharge hole 66 and 175 and the metering valve 67 and 176 are provided in the bottom surface of the storage portion 63 and 173. Even without this structure, however, the control unit can still be cooled. In this case, for example, the hydraulic fluid may be discharged to the oil pan 108 by overflowing from an open portion formed in an upper surface of the storage portion. Alternatively, only the metering valve 67 and 176 may be omitted and the hydraulic fluid may return to the oil pan 108 through the discharge hole 66 and 175.

In the foregoing example embodiment, the structure is such that all of the hydraulic fluid that returns to the automatic transmission 2 after being cooled by the oil cooler 10 flows into the storage portion 63 and 173. Alternatively, however, the structure may be such that only some of the hydraulic fluid flows into the storage portion 63 and 173. Further, if it is not necessary to maintain the cooling function at that high a level, the cooled hydraulic fluid does not have to be made to flow directly into the storage portion.

In the foregoing example embodiment, the storage portion 63 and 173 is formed to surround the entire outer periphery of the encasing portion 62 of the control unit 6 or the guide portion 172 of the control unit 106. Alternatively, for example, the storage portion 63 and 173 may be formed to cover only a portion of the outer periphery of the encasing portion 62 or the guide portion 172.

The storage portion 63 and 173 surround the entire control unit 6 and 106. Alternatively, for example, a structure can be employed in which cooling of the control unit 6 and 106 is localized by providing the storage portion in a location corresponding to a portion of the control unit 6 and 106 where the temperature increase is large.

In the second example embodiment, the guide portion 172 and the storage portion 173 are integrally formed. Alternatively, however, the guide portion 172 and the storage portion 173 may be formed separately.

The control unit that electrically controls the hydraulic pressure supply unit may be a control unit that controls only the automatic transmission 2, i.e., a so-called dedicated control unit for an automatic transmission, or a control unit that is combined with an engine control unit that controls the engine 1, for example, in addition to controlling the automatic transmission.

The method of connecting the hydraulic pressure supply unit 5 to the control unit 6 and 106 is not limited to the methods illustrated in the foregoing example embodiments. That is, the method of connection may be different from those described above as long as the control unit is disposed inside the case and is detachably connected to the hydraulic pressure supply unit.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An automatic transmission comprising:
    a hydraulic pressure supply unit which is disposed, together with a gear train, inside a case and switches a shift state (gear ratio) of the gear train based on a supply of hydraulic pressure from hydraulic fluid;
    a control unit which is disposed in the case and detachably connected to the hydraulic pressure supply unit, and electrically controls the hydraulic pressure supply unit; and
    a storage portion which is provided in the case and temporarily stores hydraulic fluid supplied to the gear train, and cools the control unit by the stored hydraulic fluid,
    wherein the storage portion is provided with a metering valve that discharges hydraulic fluid stored in the storage portion to an oil pan, and the metering valve is a temperature sensitive valve in which an opening amount thereof is adjusted such that less hydraulic fluid is discharged the higher the temperature of the hydraulic fluid in the storage portion.

2. The automatic transmission according to claim 1, wherein a through-hole for inserting the control unit from outside of the case, and a guide portion for guiding the control unit when the control unit is inserted into the case, are formed in a gear case, and the storage portion is formed on the guide portion.

3. The automatic transmission according to claim 1, wherein the storage portion is formed on an outer peripheral surface of a case housing the control unit.

4. The automatic transmission according to claim 1, further comprising:
    an oil cooler which cools the hydraulic fluid and is provided outside the case,
    wherein at least some of the hydraulic fluid that was cooled by the oil cooler is supplied to the hydraulic pressure supply unit after being stored in the storage portion.

5. The automatic transmission according to claim 2, further comprising:
    an oil cooler which cools the hydraulic fluid and is provided outside the case,
    wherein at least some of the hydraulic fluid that was cooled by the oil cooler is supplied to the hydraulic pressure supply unit after being stored in the storage portion.

6. The automatic transmission according to claim 3, further comprising:
    an oil cooler which cools the hydraulic fluid and is provided outside the case,
    wherein at least some of the hydraulic fluid that was cooled by the oil cooler is supplied to the hydraulic pressure supply unit after being stored in the storage portion.

7. The automatic transmission according to claim 1, wherein the metering valve is formed of a shape memory alloy.

8. The automatic transmission according to claim 2, wherein the metering valve is formed of a shape memory alloy.

9. The automatic transmission according to claim 3, wherein the metering valve is formed of a shape memory alloy.

10. The automatic transmission according to claim 4, wherein the metering valve is formed of a shape memory alloy.

11. The automatic transmission according to claim 5, wherein the metering valve is formed of a shape memory alloy.

12. The automatic transmission according to claim 6, wherein the metering valve is formed of a shape memory alloy.

13. An automatic transmission comprising:
    a hydraulic pressure supply unit which is disposed, together with a gear train, inside a case and switches a shift state (gear ratio) of the gear train based on a supply of hydraulic pressure from hydraulic fluid;
    a control unit which is disposed in the case and detachably connected to the hydraulic pressure supply unit, and electrically controls the hydraulic pressure supply unit; and
    a storage portion which is provided in the case and temporarily stores hydraulic fluid supplied to the gear train, and cools the control unit by the stored hydraulic fluid,
    wherein the storage portion is provided with a metering valve that discharges hydraulic fluid stored in the storage portion to an oil pan, the metering valve being formed of a shape memory alloy and being a temperature sensitive valve in which an opening amount thereof changes depending on the temperature of the hydraulic fluid in the storage portion.

* * * * *